(12) United States Patent
Yu et al.

(10) Patent No.: US 12,498,306 B2
(45) Date of Patent: Dec. 16, 2025

(54) CONSTANT-SPEED DYNAMIC DIRECT-SHEAR TEST SYSTEM AND TEST METHOD FOR ROCK MASS STRUCTURAL PLANE

(71) Applicant: CHINA UNIVERSITY OF MINING AND TECHNOLOGY, Xuzhou (CN)

(72) Inventors: Liyuan Yu, Xuzhou (CN); Minghe Ju, Xuzhou (CN); Baoshan Yao, Xuzhou (CN); Lihua Hu, Xuzhou (CN); Mingwei Zhang, Xuzhou (CN); Zejun Tao, Xuzhou (CN); Zichen Yuan, Xuzhou (CN); Xiaoxiao Su, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 298 days.

(21) Appl. No.: 18/452,729

(22) Filed: Aug. 21, 2023

(65) Prior Publication Data

US 2025/0012689 A1      Jan. 9, 2025

(30) Foreign Application Priority Data

Jul. 7, 2023   (CN) .......................... 202310831111.6

(51) Int. Cl.
*G01N 3/24*       (2006.01)
*G01N 3/02*       (2006.01)
*G01N 3/307*      (2006.01)

(52) U.S. Cl.
CPC ....... *G01N 3/24* (2013.01); *G01N 2203/0012* (2013.01); *G01N 2203/0025* (2013.01);
(Continued)

(58) Field of Classification Search
CPC ............. G01N 3/24; G01N 2203/0012; G01N 2203/0025; G01N 2203/0048; G01N 2203/0641; G01N 3/02; G01N 3/36; G01N 3/10; G01N 3/307; G01N 33/24; G01N 3/22; G01N 3/12; G01N 3/28; G01N 3/16; G01N 15/0806; G01N 3/04; G01N 3/08; G01N 3/30; G01N 15/082; G01N 3/34; G01N 3/14; G01N 19/00; G01N 3/62; G01N 3/00; G01N 15/08; G01N 3/18; G01N 1/286; G01M 7/08; G01M 13/00;
(Continued)

(56) References Cited

U.S. PATENT DOCUMENTS

2018/0031457 A1 *   2/2018   Jiang ..................... G01N 33/24

FOREIGN PATENT DOCUMENTS

CN         104749055 B    * 10/2017

* cited by examiner

*Primary Examiner* — Brandi N Hopkins
(74) *Attorney, Agent, or Firm* — Kilpatrick Townsend & Stockton LLP

(57) ABSTRACT

A constant-speed dynamic direct-shear test system and a test method for a rock mass structural plane are provided; the system includes a bearing frame, a loading frame, a horizontal loading device, a normal loading device, an oil supply device and a digital controller, a shear box is arranged in the loading frame, and the loading frame is fixedly connected with a top surface of one end of the bearing frame; the oil supply device and the horizontal loading device are controlled by the digital controller and output shearing force, the normal loading device is arranged on the loading frame and provides normal force to the shear box.

9 Claims, 3 Drawing Sheets

(52) U.S. Cl.
CPC ............... *G01N 2203/0048* (2013.01); *G01N 2203/0641* (2013.01)

(58) Field of Classification Search
CPC ....... G01M 99/008; G01M 7/02; F15B 11/08; E21B 44/02
See application file for complete search history.

CONSTANT-SPEED DYNAMIC DIRECT-SHEAR TEST SYSTEM AND TEST METHOD FOR ROCK MASS STRUCTURAL PLANE

CROSS-REFERENCE TO RELATED APPLICATIONS

This disclosure claims priority to Chinese Patent Application No. 202310831111.6, filed on Jul. 7, 2023, the contents of which are hereby incorporated by reference in its entirety for all purposes.

TECHNICAL FIELD

The disclosure belongs to the technical field of rock dynamic performance testing, and in particular to a constant-speed dynamic direct-shear test system and a test method for a rock mass structural plane.

BACKGROUND

There are usually natural joints and cracks in the rock mass, these natural joints and cracks change stress propagation paths in the rock mass and have a great influence on the strength and deformation of the rock mass. When the rock mass is disturbed by the underground engineering, such as blasting, hydraulic fracturing, mining of mineral resources and other activities, the strength of the rock mass structural plane is reduced, which may easily lead to sliding and dislocation of the rock mass along the structural plane, and further lead to dynamic disasters such as landslides or earthquakes, accompanied by a dynamic shearing process. The study on dynamic shear behaviors of the rock mass structural plane is mainly used in slope stability analysis, underground engineering excavation and other scenes.

However, at present, the system for testing dynamic direct-shear of the main rock mass structural plane in the laboratory has following technical problems: the shear rate is low, so the dynamic instability and failure process of structural plane cannot be completely presented, and it is difficult to realize constant-speed dynamic shear loading; and the system design is too large and complicated, so the stability and safety are in doubt. Therefore, there is an urgent need for a dynamic direct-shear test system and a test method for the rock mass structural plane with simplicity, convenience and high stability in the test process.

SUMMARY

In order to solve the above technical problems, the disclosure provides a constant-speed dynamic direct-shear test system and a test method for a rock mass structural plane, aiming at solving or improving at least one of the above technical problems.

In order to achieve the above purpose, the disclosure provides a constant-speed dynamic direct-shear test system for the rock mass structural plane, including a bearing frame, a loading frame, a horizontal loading device, a normal loading device, an oil supply device and a digital controller:

the loading frame is fixedly connected with a top surface of one end of the bearing frame, a shear box is arranged in the loading frame, and a rock sample is arranged on the shear box;
the digital controller is fixedly arranged on a top surface of the bearing frame;
the horizontal loading device is arranged on the top surface of the bearing frame, an output end of the horizontal loading device faces a side surface of the rock sample, and the horizontal loading device is electrically connected with the digital controller;
the normal loading device is arranged on the loading frame, and an output end of the normal loading device faces a top surface of the rock sample;
the oil supply device is located at one side of the bearing frame, the oil supply device is communicated with the horizontal loading device and is electrically connected with the digital controller.

Optionally, the oil supply device includes an oil tank, the oil tank is communicated with an oil pump and an accumulator: the oil pump and the accumulator are communicated with a motor valve; the motor valve is communicated with the horizontal loading device: the oil pump and the motor valve are installed on the oil tank: the accumulator is located at one side of the oil tank; and both the oil pump and the motor valve are electrically connected with the digital controller.

Optionally, the horizontal loading device includes a servo motor, a high-speed oil cylinder, a connecting sleeve, a first oil cylinder and a second oil cylinder sequentially connected from left to right and fixedly installed on a top surface of the loading frame: an output end of the second oil cylinder is fixedly connected with a shear impact block, the shear impact block faces the side surface of the rock sample: a laser detector is fixedly installed on the shear impact block; a laser is installed on a side wall of the loading frame, centers of the laser and the laser detector are located at a same horizontal line, and the servo motor is electrically connected with the digital controller.

Optionally, the high-speed oil cylinder is provided with a high-speed oil cylinder first oil inlet, a high-speed oil cylinder second oil inlet and a high-speed oil cylinder oil-return port: the motor valve is provided with a motor valve first oil outlet and a motor valve second oil outlet: the high-speed oil cylinder first oil inlet is communicated with the motor valve first oil outlet: the high-speed oil cylinder second oil inlet is communicated with the motor valve second oil outlet; and the oil tank is provided with an oil tank oil-return port communicated with the high-speed oil cylinder oil-return port.

Optionally, an oil filter is fixedly installed on the oil tank, an oil pump inlet and an oil pump outlet are arranged on the oil pump, the oil pump inlet is communicated with the oil tank, the oil pump outlet is communicated with the oil filter, the oil filter is provided with an oil filter outlet, and the motor valve is provided with a motor valve first oil inlet communicated with the oil filter outlet.

Optionally, the accumulator is provided with an accumulator oil inlet and an accumulator oil outlet, the accumulator oil inlet is communicated with the oil tank, and the motor valve is provided with a motor valve second oil inlet communicated with the accumulator oil outlet.

Optionally, an oil pressure gauge is fixedly installed on the oil tank, and the oil pressure gauge is electrically connected with the motor valve.

Optionally, the shear box includes a backing plate, the backing plate is fixedly installed on an inner bottom surface of the loading frame: a left limit block and a U-shaped right limit block are fixedly installed on the backing plate: the left limit block and the U-shaped right limit block enclose an accommodating cavity adapted to the rock sample: a top surface of the U-shaped right limit block is lower than a cracking surface of the rock sample: the left limit block is slidably connected with an impact rod: one end of the impact rod faces an upper cracking part of the rock sample, and an other end of the impact rod is fixedly connected with a horizontal impact head, the horizontal impact head is detachably connected with the shear impact block, and a horizontal sensor is fixedly installed on the horizontal impact head.

Optionally, the normal loading device includes a one-way hydraulic jack, the one-way hydraulic jack is fixedly installed on a top wall of the loading frame: an output end of the one-way hydraulic jack is fixedly connected with a normal impact head: a square tray is fixedly connected with the normal impact head: a roller is installed on the square tray: the roller is detachably connected with the top surface of the rock sample: a normal sensor is installed on the normal impact head; and the one-way hydraulic jack is in transmission connection with a manual hydraulic device, a hydraulic meter is installed on the manual hydraulic device.

A constant-speed dynamic direct-shear test method for the rock mass structural plane includes following steps:
step 1: placing a rock sample;
step 2, performing a normal loading on the rock sample;
step 3: adjusting a horizontal impact stroke and a dynamic shear speed;
step 4, performing the horizontal impact on the rock sample and deriving data; and
step 5: stopping the horizontal impact and the normal loading on the rock sample, and removing the rock sample.

Compared with the prior art, the embodiments have following advantages and technical effects: the rock sample is placed in the shear box, and the top surface of the rock sample is loaded with normal force by the normal loading mechanism. Then, the oil supply device and the horizontal loading device are controlled by the digital controller, and the impact stroke and the dynamic shear speed are input. On the premise of increasing the shear rate, the rock sample is subjected to constant-speed dynamic direct-shear, so as to improve the reliability of test results and the accuracy of quantitative analysis. At the same time, the test process is simple, fast and stable.

BRIEF DESCRIPTION OF THE DRAWINGS

The accompanying drawings, which constitute a part of this disclosure, are used to provide a further understanding of this disclosure. The illustrative embodiments of this disclosure and their descriptions are used to explain this disclosure, and do not constitute an improper limitation of this disclosure. In the attached drawings.

DETAILED DESCRIPTION OF THE EMBODIMENTS

In the following, the technical scheme in the embodiment of the disclosure is clearly and completely described with reference to the attached drawings. Obviously, the described embodiment is only a part of the embodiment of the disclosure, but not the whole embodiment. Based on the embodiments in the present disclosure, all other embodiments obtained by ordinary technicians in the field without creative labor belong to the scope of protection of the present disclosure.

In order to make the above objects, features and advantages of the present disclosure more obvious and easier to understand, the present disclosure is further described in detail with the attached drawings and specific embodiments.

Figure 1:
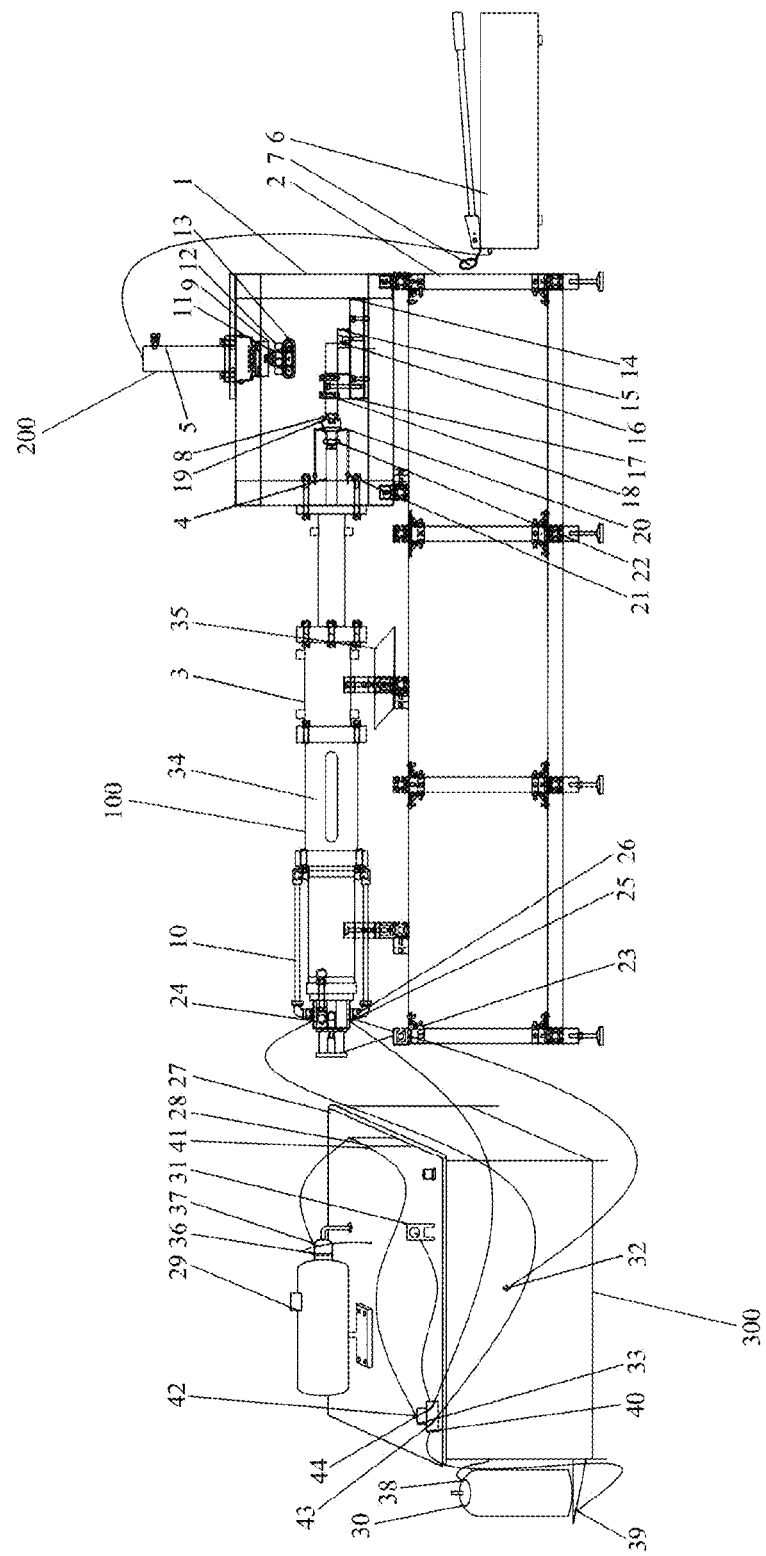
FIG. 1 is a schematic diagram of an overall structure according to embodiments of the present disclosure.
Figure 2:
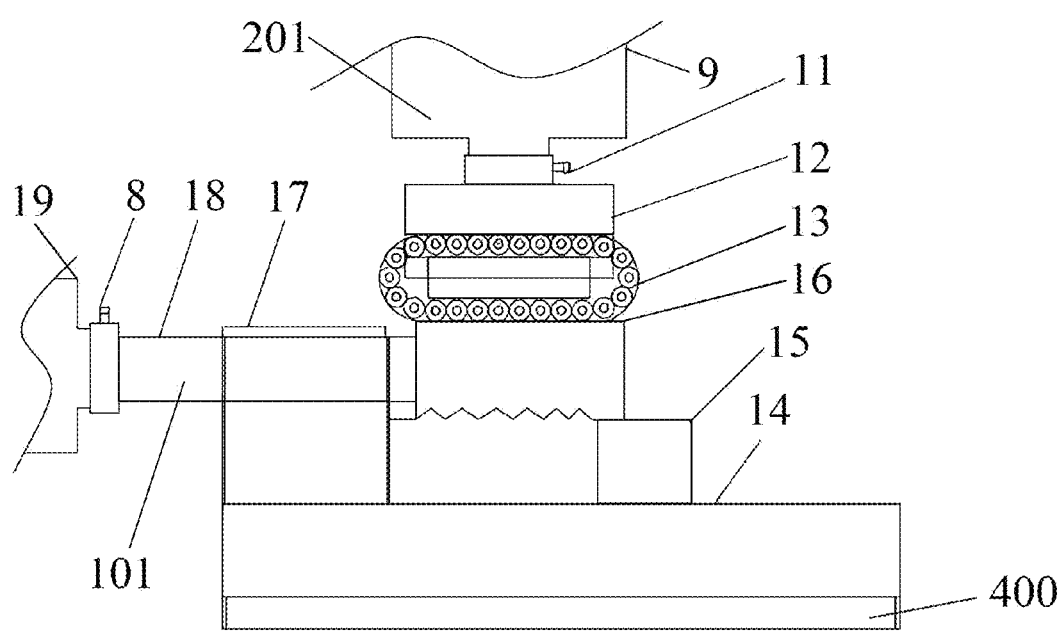
FIG. 2 is a schematic structural diagram of a shear box according to embodiments of the present disclosure.
Figure 3:
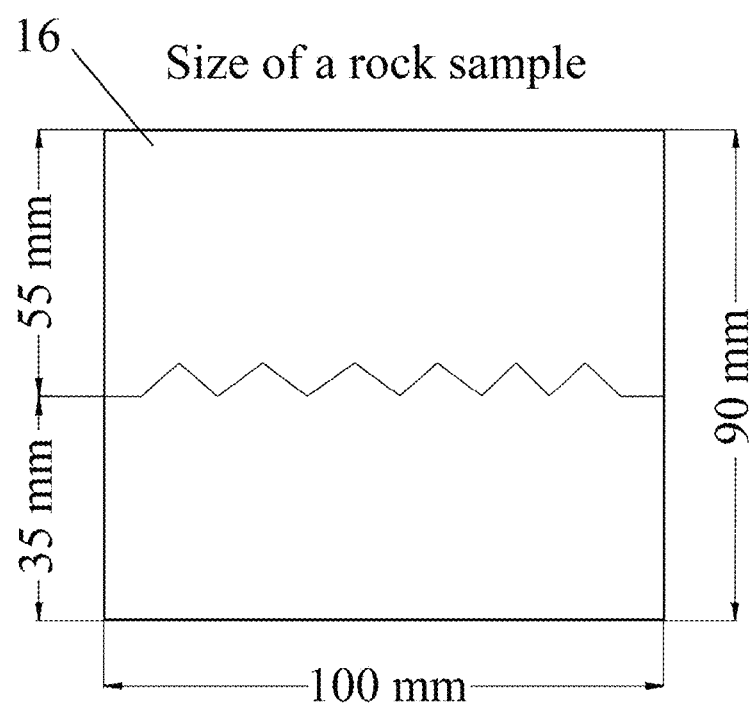
FIG. 3 is a schematic diagram of a size of a rock sample according to embodiments of the present disclosure.

Referring to FIG. 1, FIG. 2 and FIG. 3, this embodiment provides a constant-speed dynamic direct-shear test system for a rock mass structural plane, including a bearing frame 2, a loading frame 1, a horizontal loading device 100, a normal loading device 200, an oil supply device 300 and a digital controller 35;

the loading frame 1 is fixedly connected with a top surface of one end of the bearing frame 2, a shear box 400 is arranged in the loading frame 1, and a rock sample 16 is arranged on the shear box 400;

the digital controller 35 is fixedly arranged on a top surface of the bearing frame 2;

the horizontal loading device 100 is arranged on the top surface of the bearing frame 2, an output end 101 of the horizontal loading device 100 faces a side surface of the rock sample 16, and the horizontal loading device is electrically connected with the digital controller 35;

the normal loading device is arranged on the loading frame 1, and an output end 201 of the normal loading device 200 faces a top surface of the rock sample 16;

the oil supply device is located at one side of the bearing frame 2, the oil supply device is communicated with the horizontal loading device and is electrically connected with the digital controller 35.

The rock sample 16 is placed in the shear box, and the top surface of the rock sample is loaded with normal force by the normal loading mechanism. Then, the oil supply device and the horizontal loading device are controlled by the digital controller 35, and the impact stroke and dynamic shear speed are input. On the premise of increasing the shear rate, the rock sample 16 is subjected to constant-speed dynamic direct-shear, so as to improve the reliability of test results and the accuracy of quantitative analysis. At the same time, the test process is simple, fast and stable.

In a further optimization scheme, the oil supply device comprises an oil tank 27, the oil tank 27 is communicated with an oil pump 29 and an accumulator 30, the oil pump 29 and the accumulator 30 are communicated with a motor valve 33, the motor valve 33 is communicated with the horizontal loading device, the oil pump 29 and the motor valve 33 are installed on the oil tank 27, the accumulator 30 is located at one side of the oil tank 27, and both the oil pump 29 and the motor valve 33 are electrically connected with the digital controller 35.

The oil pump 29 and the motor valve 33 are controlled by the digital controller 35, and the hydraulic oil in the oil tank 27 is input into the motor valve 33 by the oil pump 29 and the accumulator 30, and the hydraulic oil is input into the horizontal loading device by the motor valve 33.

In a further optimization scheme, the horizontal loading device includes a servo motor 23, a high-speed oil cylinder 10, a connecting sleeve 34, a first oil cylinder 3 and a second oil cylinder 4 sequentially connected from left to right and fixedly installed on a top surface of the loading frame 1: an output end of the second oil cylinder 4 is fixedly connected with a shear impact block 22, the shear impact block 22 faces the side surface of the rock sample 16, a laser detector 20 is fixedly installed on the shear impact block 22, and a laser 21 is installed on a side wall of the loading frame 1, centers of the laser 21 and the laser detector 20 are located at a same horizontal line, and the servo motor 23 is electrically connected with the digital controller 35.

The servo motor 23 is controlled by the digital controller 35, so that the servo motor 23 drives the high-speed oil cylinder 10, and the hydraulic oil in the high-speed oil cylinder 10 pushes the first oil cylinder 3 and the second oil cylinder 4, so that the shear impact block 22 is pushed to shear the rock sample, and at the same time, the laser 21 and the laser detector 20 cooperate to record the corresponding displacement data.

Furthermore, a cross-sectional area ratio of the second oil cylinder 4 to the first oil cylinder 3 is 1:4, so that the stroke of the second oil cylinder 4 is four times that of the first oil cylinder 3 under the same thrust.

In a further optimization scheme, the high-speed oil cylinder 10 is provided with a high-speed oil cylinder first oil inlet 24, a high-speed oil cylinder second oil inlet 25 and a high-speed oil cylinder oil-return port 26: the motor valve 33 is provided with a motor valve first oil outlet 43 and a motor valve second oil outlet 44: the high-speed oil cylinder first oil inlet 24 is communicated with the motor valve first oil outlet 43: the high-speed oil cylinder second oil inlet 25 is communicated with the motor valve second oil outlet 44; and the oil tank 27 is provided with an oil tank oil-return port 32 and is communicated with the high-speed oil cylinder oil-return port 26.

The hydraulic oil input by the oil pump 29 and the accumulator 30 is respectively input into the high-speed oil cylinder first oil inlet 24 and the high-speed oil cylinder second oil inlet 25 through the motor valve first oil outlet 43 and the motor valve second oil outlet 44, so that the hydraulic oil enters the high-speed oil cylinder 10, and the high-speed oil cylinder oil-return port 26 is communicated with the oil tank oil-return port 32 to facilitate the return of the hydraulic oil into the oil tank 27.

In a further optimization scheme, an oil filter 28 is fixedly installed on the oil tank 27, and the oil pump 29 is provided with an oil pump inlet 36 and an oil pump outlet 37, the oil pump inlet 36 is communicated with the oil tank 27, the oil pump outlet 37 is communicated with the oil filter 28, the oil filter 28 is provided with an oil filter outlet 41, and the motor valve 33 is provided with a motor valve first oil inlet 42 communicated with the oil filter outlet 41.

The hydraulic oil in the oil tank 27 enters the oil pump 29 through the oil pump inlet 36, enters the oil filter 28 through the oil pump outlet 37, and enters the motor valve 33 through the motor valve first oil inlet 42 through the oil filter outlet 41.

In a further optimization scheme, the accumulator 30 is provided with an accumulator oil inlet 38 and an accumulator oil outlet 39, the accumulator oil inlet 38 is communicated with the oil tank 27, and the motor valve 33 is provided with a motor valve second oil inlet 40 communicated with the accumulator oil outlet 39.

The hydraulic oil in the oil tank 27 enters the accumulator 30 through the accumulator oil inlet 38, and enters the motor valve 33 through the accumulator oil outlet 39 and then through the motor valve second oil inlet 40.

Furthermore, high-pressure oil pipes communicates the high-speed oil cylinder first oil inlet 24 and the motor valve first oil outlet 43, the high-speed oil cylinder second oil inlet 25 and the motor valve second oil outlet 44, the oil tank oil-return port 32 and the high-speed oil cylinder oil-return port 26, the oil pump inlet 36 and the oil tank 27, the oil pump outlet 37 and the oil filter 28, the motor valve first oil inlet 42 and the oil filter outlet 41, the accumulator oil inlet 38 and the oil tank 27, and the motor valve second oil inlet 40 and the accumulator oil outlet 39.

Furthermore, the digital controller 35 is connected with the oil pump 29, the motor valve 33 and the servo motor 23 through cables to control the whole experiment process.

In a further optimization scheme, an oil pressure gauge 31 is fixedly installed on the oil tank 27, and the oil pressure gauge 31 is electrically connected with the motor valve 33.

The oil pressure in the motor valve 33 is observed through the oil pressure gauge 31, and the oil pressure gauge 31 is connected with the motor valve 33 through pipelines.

In a further optimization scheme, the shear box comprises a backing plate 14, the backing plate 14 is fixedly installed on an inner bottom surface of the loading frame 1: a left limit block 17 and a U-shaped right limit block 15 are fixedly installed on the backing plate 14: the left limit block 17 and the U-shaped right limit block 15 enclose an accommodating cavity adapted to the rock sample 16: a top surface of the U-shaped right limit block 15 is lower than a cracking surface of the rock sample 16; the left limit block 17 is slidably connected with an impact rod 18; one end of the impact rod 18 faces an upper cracking part of the rock sample 16, and another end of the impact rod 18 is fixedly connected with a horizontal impact head 19, the horizontal impact head 19 is detachably connected with the shear impact block 22, and a horizontal sensor 8 is fixedly installed on the horizontal impact head 19. As shown in FIG. 3, the size of the rock sample 16 is as follows: a height of the rock sample 16 is 90 millimeters (mm), and a length of the rock sample 16 is 100 mm. A distance between a top surface of the rock sample and the cracking surface of the rock sample is 55 mm, and a distance between a bottom surface of the rock sample and the cracking surface of the rock sample is 35 mm.

The position of the rock sample 16 is limited by the left limit block 17 and the U-shaped right limit block 15, and the horizontal impact head 19 is impacted by the shear impact block 22, the horizontal impact head 19 drives the impact rod 18 to horizontally impact the rock sample 16, and the horizontal sensor 8 records the magnitude of the horizontal pressure during the impact process.

In a further optimization scheme, the normal loading device includes a one-way hydraulic jack 5, the one-way hydraulic jack 5 is fixedly installed on a top wall of the loading frame 1: an output end of the one-way hydraulic jack 5 is fixedly connected with a normal impact head 9; a square tray 12 is fixedly connected with the normal impact head 9: a roller 13 is installed on the square tray 12: the roller 13 is detachably connected with the top surface of the rock sample 16: a normal sensor 11 is installed on the normal impact head 9; and the one-way hydraulic jack 5 is in transmission connection with a manual hydraulic device 6, a hydraulic meter 7 is installed on the manual hydraulic device.

The manual hydraulic device 6 controls the one-way hydraulic jack 5 to drive the normal impact head 9, the square tray 12 and the roller 13 to move, so that the roller 13 contacts the top surface of the rock sample at 97 millimeters (mm) to realize normal loading, and the normal sensor 11 collects real-time normal force data.

The rock sample 16 of the present embodiment is a rock joint shear test block with a specific size.

The Working Principle:

the manual hydraulic device 6 controls the one-way hydraulic jack 5 to move downwards, and the required normal pressure is applied on the rock sample 16 through the corresponding relationship between the readings of the hydraulic meter 7 and the pressure value of the normal sensor 11 calibrated in advance.

The constant dynamic impact speed and the impact stroke are preset by the digital controller 35. After the oil source is turned on to start the control, the oil pump 29 starts pumping the hydraulic oil from the oil tank 27. After the valve control is started, the motor valve 33 is started, and the oil pump 29 delivers oil to the high-speed oil cylinder 10 through the high-pressure oil pipe. At the same time, in order to ensure sufficient oil supply, the accumulator 30 also delivers the hydraulic oil to the high-speed oil cylinder 10 through the high-pressure oil pipe.

The servo motor 23 is connected with the high-speed oil cylinder 10 and converts the high-speed rotary motion into the linear motion. The hydraulic oil in the high-speed oil cylinder 10 pushes the first oil cylinder 3 forward, and then the hydraulic oil continues to push the second oil cylinder 4 forward.

After the second oil cylinder 4 extends forward, the second oil cylinder 4 drives the shear impact block 22 to hit the horizontal impact head 19, and the horizontal impact head 19 and the impact rod 18 move forward to start shearing the rock sample 16.

The horizontal sensor 8 collects horizontal pressure data, the normal sensor 11 collects real-time normal force data, and the laser detector 20 records the displacement value.

A constant-speed dynamic direct-shear test method for a rock mass structural plane includes following steps:

step 1: placing a rock sample:

the rock sample 16 is placed in the space surrounded by the left limit block 17 and the U-shaped right limit block 15 in the shear box, and the rock sample 16 is processed into a specific size, and the lower plate of the rock sample 16 is stuck in the groove of the U-shaped right limit block 15.

Step 2, performing a normal loading on the rock sample:

the pressure delivered by the manual hydraulic device 6 makes the one-way hydraulic jack 5 move downwards, and the required normal pressure value is applied through the corresponding relationship between the hydraulic meter 7 calibrated in advance and the pressure value of the normal sensor 11.

step 3: adjusting a horizontal impact stroke and a dynamic shear speed:

the oil source start and valve control switches on the digital controller 35 are turned on successively, and then the maximum stroke value of the high-speed oil cylinder 10, the first oil cylinder 3 and the second oil cylinder 4 moving forward to the horizontal impact head 19 and the speed value of the constant-speed movement are input, and finally the start impact switch is turned on.

Step 4, performing the horizontal impact on the rock sample and deriving data:

the second oil cylinder 4 impacts the horizontal impact head 19 when moving to the designated position: at this time, the horizontal sensor 8 records the magnitude of the horizontal pressure in the impact process, the normal sensor 11 records the change process of the normal pressure due to the dilatancy effect and the wear shearing effect during the shearing process, and the laser detector 20 records the corresponding displacement data.

Step 5: ending the experiment, stopping the horizontal impact and the normal loading, and removing the rock sample.

After the impact, the control of the motor valve 33 is disconnected first, and then the supply of oil source is stopped, the hydraulic oil returns to the oil tank 27 through the high-pressure oil pipe, and the second oil cylinder 4 is reset to the initial position, the normal pressure is unloaded, the rock sample 16 is removed and the rock fragments are cleaned up.

According to the disclosure, the evolution of displacement field and the variation law of normal and tangential stress may be obtained, and finally the dynamic shear strength characteristics of rock structural plane and the evolution law of structural plane roughness may be obtained by analysis: therefore, it is convenient for efficiently and accurately studying the constant-speed dynamic shear physical and mechanical characteristics of the rock structural plane.

In the description of the invention, it should be understood that the terms "longitudinal", "transverse", "upper", "lower", "front", "rear", "left", "right", "vertical", "horizontal", "top", "bottom", "inner", "outer", etc. and other directions or positional relationships are based on the orientation or positional relationship shown in the drawings are only for the convenience of describing the invention, rather than indicating or implying that the device or element referred to must have a specific orientation, be configured and operated in a specific orientation, and therefore cannot be understood as a limitation to the disclosure.

The above-mentioned embodiments only describe the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A constant-speed dynamic direct-shear test system for a rock mass structural plane, comprising a bearing frame, a loading frame, a horizontal loading device, a normal loading device, an oil supply device and a digital controller;
   wherein the loading frame is fixedly connected with a top surface of one end of the bearing frame, a shear box is arranged in the loading frame, and a rock sample is arranged on the shear box;
   the digital controller is fixedly arranged on a top surface of the bearing frame;
   the horizontal loading device is arranged on the top surface of the bearing frame, an output end of the horizontal loading device faces a side surface of the rock sample, and the horizontal loading device is electrically connected with the digital controller;
   the normal loading device is arranged on the loading frame, the normal loading device comprises a one-way hydraulic jack, the one-way hydraulic jack is fixedly installed on a top wall of the loading frame, an output end of the one-way hydraulic jack is fixedly connected with a normal impact head, a square tray is fixedly connected with the normal impact head, a roller is installed on the square tray, the roller is detachably connected with a top surface of the rock sample, a normal sensor is installed on the normal impact head, and the one-way hydraulic jack is in transmission connection with a manual hydraulic device, a hydraulic meter is installed on the manual hydraulic device; and
   the oil supply device is located at one side of the bearing frame, the oil supply device is in communication with the horizontal loading device and is electrically connected with the digital controller.

2. The constant-speed dynamic direct-shear test system for a rock mass structural plane according to claim 1, wherein the oil supply device comprises an oil tank, the oil tank is in communication with an oil pump and an accumulator; the oil pump and the accumulator are in communication with a motor valve; the motor valve is in communication with the horizontal loading device; the oil pump and the motor valve are installed on the oil tank; the accumulator is located at one side of the oil tank; and both the oil pump and the motor valve are electrically connected with the digital controller.

3. The constant-speed dynamic direct-shear test system for a rock mass structural plane according to claim 2, wherein the horizontal loading device comprises a servo motor, a high-speed oil cylinder, a connecting sleeve, a first oil cylinder and a second oil cylinder sequentially connected from left to right and fixedly installed on a top surface of the loading frame; an output end of the second oil cylinder is fixedly connected with a shear impact block, the shear impact block faces the side surface of the rock sample; a laser detector is fixedly installed on the shear impact block; and a laser is installed on a side wall of the loading frame, centers of the laser and the laser detector are located at a same horizontal line, and the servo motor is electrically connected with the digital controller.

4. The constant-speed dynamic direct-shear test system for a rock mass structural plane according to claim 3, wherein the high-speed oil cylinder is provided with a high-speed oil cylinder first oil inlet, a high-speed oil cylinder second oil inlet and a high-speed oil cylinder oil-return port; the motor valve is provided with a motor valve first oil outlet and a motor valve second oil outlet; the high-speed oil cylinder first oil inlet is in communication with the motor valve first oil outlet; the high-speed oil cylinder second oil inlet is in communication with the motor valve second oil outlet; and the oil tank is provided with an oil tank oil-return port in communication with the high-speed oil cylinder oil-return port.

5. The constant-speed dynamic direct-shear test system for a rock mass structural plane according to claim 3, wherein the shear box comprises a backing plate, the backing plate is fixedly installed on an inner bottom surface of the loading frame; a left limit block and a U-shaped right limit block are fixedly installed on the backing plate; the left limit block and the U-shaped right limit block enclose an accommodating cavity adapted to the rock sample; a top surface of the U-shaped right limit block is lower than a cracking surface of the rock sample; the left limit block is slidably connected with an impact rod; and one end of the impact rod faces an upper cracking part of the rock sample, and another end of the impact rod is fixedly connected with a horizontal impact head, the horizontal impact head is detachably connected with the shear impact block, and a horizontal sensor is fixedly installed on the horizontal impact head.

6. The constant-speed dynamic direct-shear test system for a rock mass structural plane according to claim 2, wherein an oil filter is fixedly installed on the oil tank, an oil pump inlet and an oil pump outlet are arranged on the oil pump, the oil pump inlet is in communication with the oil tank, the oil pump outlet is in communication with the oil filter, the oil filter is provided with an oil filter outlet, and the motor valve is provided with a motor valve first oil inlet in communication with the oil filter outlet.

7. The constant-speed dynamic direct-shear test system for a rock mass structural plane according to claim 2, wherein the accumulator is provided with an accumulator oil inlet and an accumulator oil outlet, the accumulator oil inlet is in communication with the oil tank, and the motor valve is provided with a motor valve second oil inlet in communication with the accumulator oil outlet.

8. The constant-speed dynamic direct-shear test system for a rock mass structural plane according to claim 2, wherein an oil pressure gauge is fixedly installed on the oil tank, and the oil pressure gauge is electrically connected with the motor valve.

9. A constant-speed dynamic direct-shear test method for a rock mass structural plane, based on the constant-speed dynamic direct-shear test system for a rock mass structural plane according to claim 1, comprising steps:
   step 1: placing the rock sample;
   step 2, performing a normal loading on the rock sample;
   step 3: adjusting a horizontal impact stroke and a dynamic shear speed;
   step 4, performing a horizontal impact on the rock sample and deriving data; and
   step 5: stopping the horizontal impact and the normal loading on the rock sample, and removing the rock sample.

\* \* \* \* \*